United States Patent
Rogel et al.

[11] 3,718,855
[45] Feb. 27, 1973

[54] EDDY CURRENT FLAW DETECTION SYSTEM

[76] Inventors: Albert P. Rogel, 2655 Ellenbrook Drive, Rancho Cordova, Calif. 95670; Joseph J. Scalese, 9507 Bullion Way, Orangevale, Calif. 95662

[22] Filed: Nov. 30, 1970

[21] Appl. No.: 93,676

[52] U.S. Cl. ................................................. 324/37
[51] Int. Cl. ............................................. G01r 33/12
[58] Field of Search .................... 324/34 R, 37, 40

[56] References Cited

UNITED STATES PATENTS

| | | | |
|---|---|---|---|
| 2,300,999 | 11/1942 | Williams | 324/37 |
| 2,308,159 | 1/1943 | Drummond et al. | 324/37 |
| 2,519,367 | 8/1950 | Gunn et al. | 324/40 |
| 2,684,464 | 7/1954 | Hastings et al. | 324/37 |
| 3,209,243 | 9/1965 | Walters et al. | 324/37 |
| 3,327,205 | 6/1967 | Wood et al. | 324/37 |
| 3,419,797 | 12/1968 | Libby | 324/40 |

Primary Examiner—Robert J. Corcoran
Attorney—Harry A. Herbert, Jr. and Henry S. Miller, Jr.

[57] ABSTRACT

An automatic eddy current flaw detection system including a measuring instrument with a chart recorder and a flaw sensing device having an eddy current probe in a housing attached to the work piece and driven by a reversible motor along a helical path into an opening in the work piece. The housing contains a standard calibration unit which the probe passes and thereby allows for instrument standardization facilitating the reproducibility of inspection conditions.

9 Claims, 4 Drawing Figures

3,718,855

EDDY CURRENT FLAW DETECTION SYSTEM

BACKGROUND OF THE INVENTION

This invention relates generally to a method and system of flow detection in metals and more particularly to an eddy current automatic scanner for locating fatigue cracks and other discontinuities in metal structures.

Eddy current probes have been used and accepted as a means for locating flows in metal structures during non destructive testing. With currently available devices the probe is hand held and inserted into a hole in the metal. A small wire wound coil attached at the end of the probe is energized with a high frequency alternating current which induces eddy currents in the wall of the hole. Any cracks or discontinuities in the hole wall effect the induced eddy current field which reacts with the balanced field of the core and translates the effect into meter readings on an eddy current power supply and measuring instrument.

This method of flaw detection, while extremely efficient from a theoretical point of view is, from a practical standpoint inefficient as well as unreliable and cumbersome. The hand held eddy current probe cannot provide valid reproducible data for recording which is essential where the holes examined are tested as part of a periodic inspection. An example of this would be certain critical mounting holes on aircraft which are required to be tested according to a predetermined schedule. The hand held probe is incapable of producing any test results that could be preserved and compared from one inspection to the next, where such results would show relative wear in the hole.

In addition to the aforementioned disadvantages of the prior art, the hand held method is extremely tedious from the inspector's standpoint. During a hole test the inspector must continually evaluate test signals from many variables including irregular rotation of the probe, tilting of the probe, out-of-the-round holes, rough holes and constant meter deflections, in order to establish the validity of the meter readings.

It appears obvious that the hand held eddy probe is of only marginal value even when used by a highly skilled technician and the pace and duration of tests thus performed is limited to the patience and endurance of the operator.

SUMMARY OF THE INVENTION

The invention consists of an automatic eddy current inspection system that can be utilized to detect fatigue cracks or discontinuities in holes and openings in aluminum, steel or other metal structures. The invention provides a universal mounting for an eddy current probe. The probe is driven through a gear arrangement by a reversible electric motor attached to the probe housing. The probe housing is attached to the universal mounting and is internally threaded to mate with an external thread on a spindle containing the probe. As the motor drives the spindle it moves into and out of the housing due to the arrangement of the threads on the spindle and the housing.

The end of the housing nearest the universal mounting contains an apertured calibration disc. As the probe is driven through the disc a recording is made of its reading through the disc. Changes in electronics of the system can be made to duplicate a preexisting test where the calibration data is available.

The calibration disc is constructed having a notch located along its inner circumference. The notch simulates a crack or discontinuity and tests the electronics to insure that they are functioning properly. The notch also is used in conjunction with a marking indicator represented by a micro switch located outside the housing and riding on the spindle extension. A groove in the spindle extension causes the switch to close once each time the spindle turns 360°. The marking switch is connected to the chart recorder of the power supply measuring unit and causes a mark to be placed along the edge of the chart paper after each revolution of the spindle.

The combination of the notched calibration disc and the marking indicator allows the inspector to determine immediately not only that a flaw has been detected but the exact location of the flaw as well.

It is therefore an object of this invention to provide a new and improved eddy current system for the non destructive testing of metals.

It is another object of this invention to provide a new and improved system for flaw detection.

It is a further object of this invention to provide an eddy current flaw detection system that is more accurate than any hitherto known.

It is still another object of the invention to provide an eddy current flaw detection system that allows repeatable inspections and the comparison of inspection data.

It is still a further object of the invention to provide a flaw detector that will record the size, length and orientation of a flaw.

It is another object of the invention to provide a eddy current flaw detector having a calibration standard.

It is another object of the invention to provide an eddy current flaw detector that is completely automatic.

It is another object of the invention to provide an automatic eddy current flaw detector that will detect flaws faster and with less operator strain than any presently known.

It is another object of the invention to provide an eddy current flaw detector that will inspect multiple layers of metal without resetting or recalibration.

It is another object of the invention to provide an automatic eddy current flaw detector system that supplies a permanent record to aid in defect interpretation.

It is another object of the invention to provide an automatic eddy current flaw detector that requires a less skilled inspector than those systems presently available.

It is another object of the invention to provide an automatic eddy current flaw detector which is economical to produce and utilizes conventional, currently available components that lend themselves to standard mass production manufacturing techniques.

These and other advantages, features and objects of the invention will become more apparent from the following description taken in connection with the illustrative embodiment in the accompanying drawings.

DESCRIPTION OF PREFERRED EMBODIMENT

Figure 1:
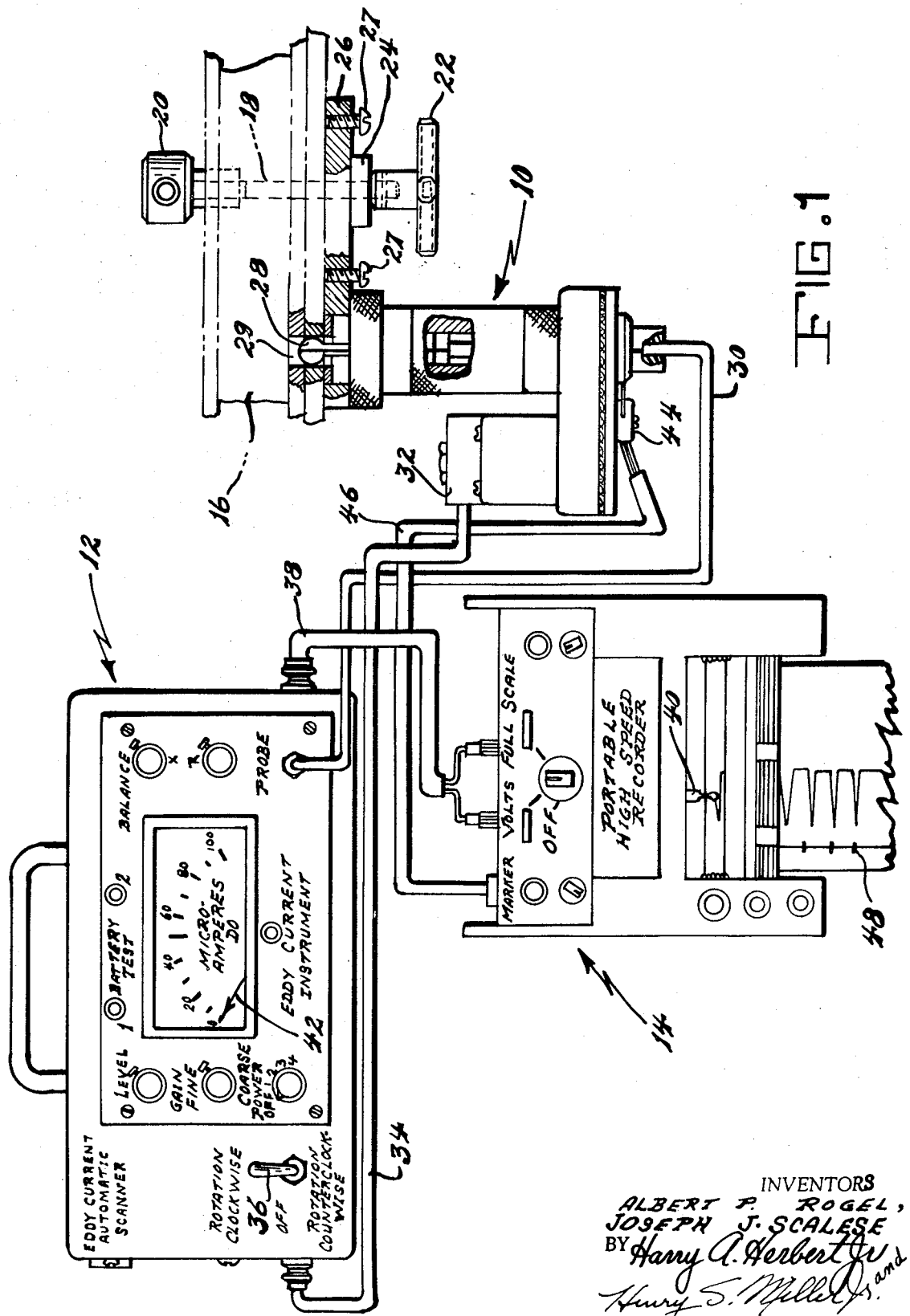
FIG. 1 is a schematic drawing of the system of the invention.

Referring now to FIG. 1 where the eddy current flaw detection system is disclosed in its entirety. The eddy current probe and its drive mechanism is shown generally at 10. The power supply measuring instrument is shown generally at 12 and the recorder shown generally at 14.

In operation, the probe and drive mechanism 10 is attached to a work piece 16 by bolt 18 having an adaptive head 20 and a nut 22. The nut presses against a washer 24 and holds the universal mounting bracket 26 in place. Leveling screws 27 level the bracket 26 to provide accurate alignment between the opening 29 and the probe 28.

The eddy current probe 28 is attached to the power supply-measuring instrument by line 30 while the drive motor 32 is attached via line 34. The drive motor is controlled from the three position switch 36 that provides "OFF," "Rotate Clockwise" and "Rotate Counterclockwise" positions.

The power supply-measuring instrument 12 has a DC Microampere meter which measures the current flow in the probe caused by an imbalance in a bridge circuit located in the probe. The bridge becomes unbalanced when the matched magnetic fields are mismatched by a flaw in the metal. The instrument 12 has means provided for calibrating a standard as will be explained hereinafter.

Connected to the instrument 12, by line 38, is a high speed chart recorder 14. The stylus 40 records the current flaw shown by the needle 42 of the instrument 12. In addition, a marking switch 44 mounted at the base of the probe and drive mechanism 10 sends a signal via line 46 to the recorder 14 and causes a mark 48 to be recorded each time the probe is rotated 360°.

Figure 2:
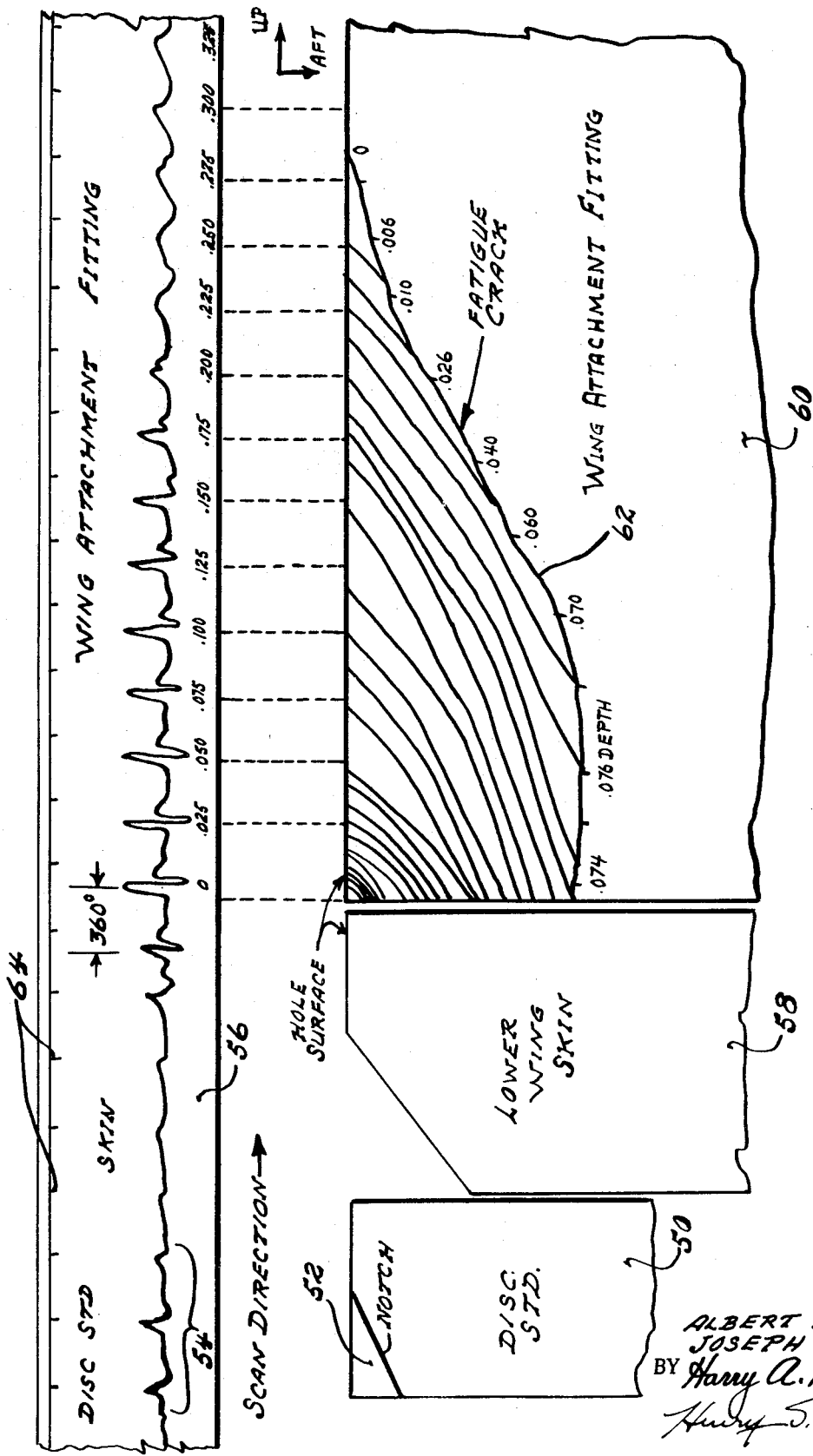
FIG. 2 is a pictorial representation showing a simulated fatigue crack and an inspection record thereof.

FIG. 2 shows a comparison between a hole in an aircraft wing attachment fitting and the recorded inspection data. The scan of the hole was taken from the left to the right as one looks at the drawing. The probe passes the standard calibration disc 50 which has a notch 52 and leaves the scan pattern 54, as the probe follows a helical path and moves ahead in 0.025 inch steps. The recording 56 shows no unusual purtubations as it passes through the wing skin 58 until it reaches the wing attachment fitting 60. As the probe approaches the fatigue crack 62 in the wing attachment fitting 60 the bridge in the electrical system becomes unbalanced and the probe tends to draw more current when rotated into the vicinity of the crack as shown by the large vertical deviations of the recorded data. As the crack closes and becomes shallower, the deviations from normal of the data decline. This decline is generally in proportion to the depth of the crack.

An important feature of the invention is the marking system shown on the data tape 56. The markings 64 indicate that the probe has turned 360°. With these marks it is then easily determined where in the hole the crack is located since the standard disc is oriented and has a notch therein to provide orientation data.

Figure 3:
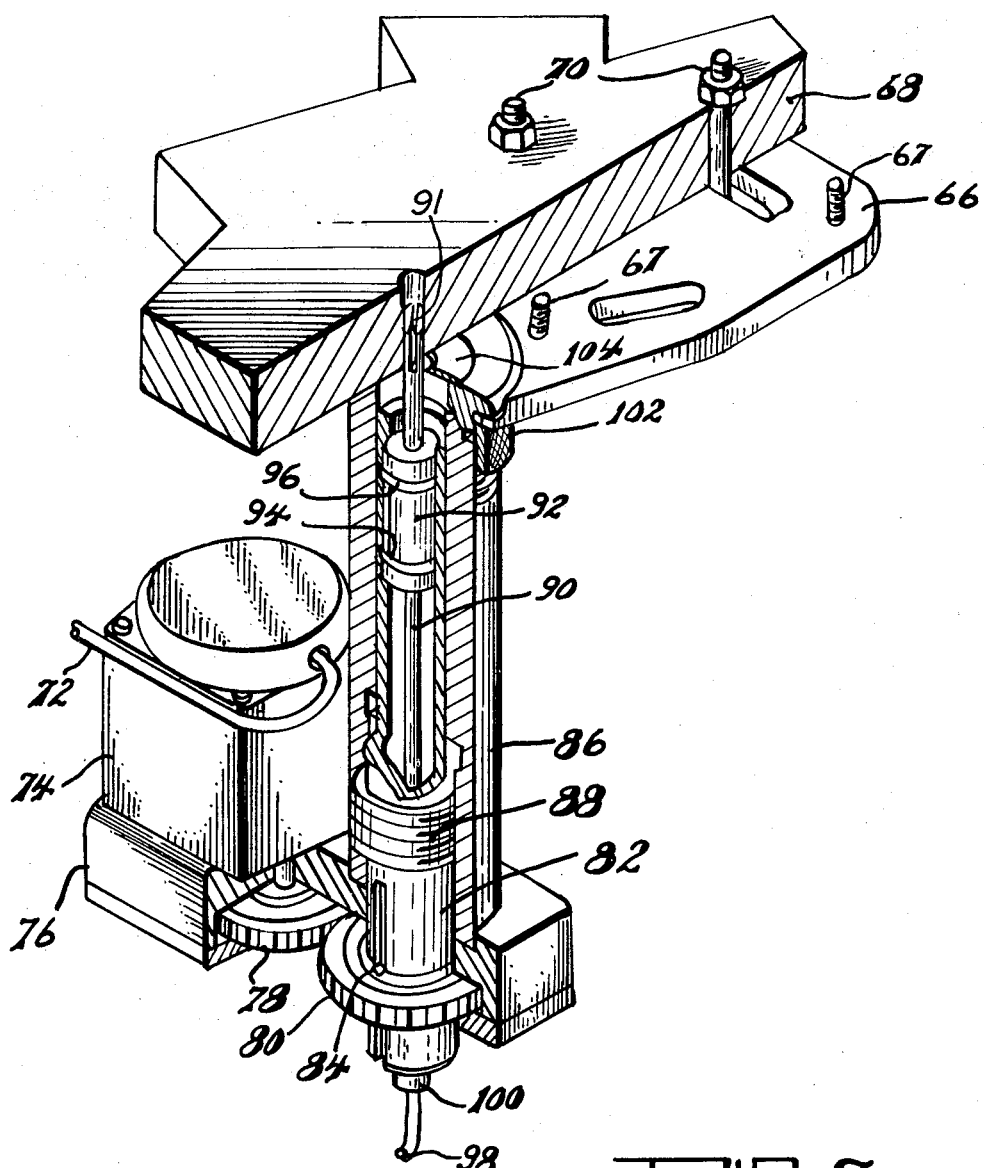
FIG. 3 is a side elevational view of the invention partly in section.

FIG. 3 shows the probe, drive and housing. The universal adapter plate 66 is held against a work piece 68 by the nut-bolt arrangement 70. A cable 72 supplies electrical current to the reversible synchronous motor 74. The motor 74 is mounted on the gear housing 76 and drives the spur gears 78 and 80. Spur gear 80 is affixed to the spindle 82 and held secure by the spindle drive key 84. the spindle is mounted in the spindle housing 86 through a threaded portion 88 which engages a similar portion in the housing 86.

The expandable eddy probe 90, similar to that made by the Ideal Specialty Company of Tulsa Okla. Model No. 6800, has a split head 91 and is expandable to adjust to various size holes. The probe is secured in the spindle by the probe holder 92. The probe holder (92) is retained by two rubber O-rings 94, 96 that allow the probe to slide longitudinally in the spindle cavity should the probe strike an obstruction during the inspection.

Attached to the probe is a signal cable 98 which is held in position at the base of the spindle by the cable holder 100.

To secure the spindle housing 86 to the universal mounting plate 66 having levelling screws 67, an attaching adapter 102 is provided secured to the mounting plate and adapted to threadingly engage the spindle housing. A calibrated standard disc 104 is mounted in a recess in the attaching adapter 102 to allow for calibrating the probe before it enters the workpiece 68.

Figure 4:
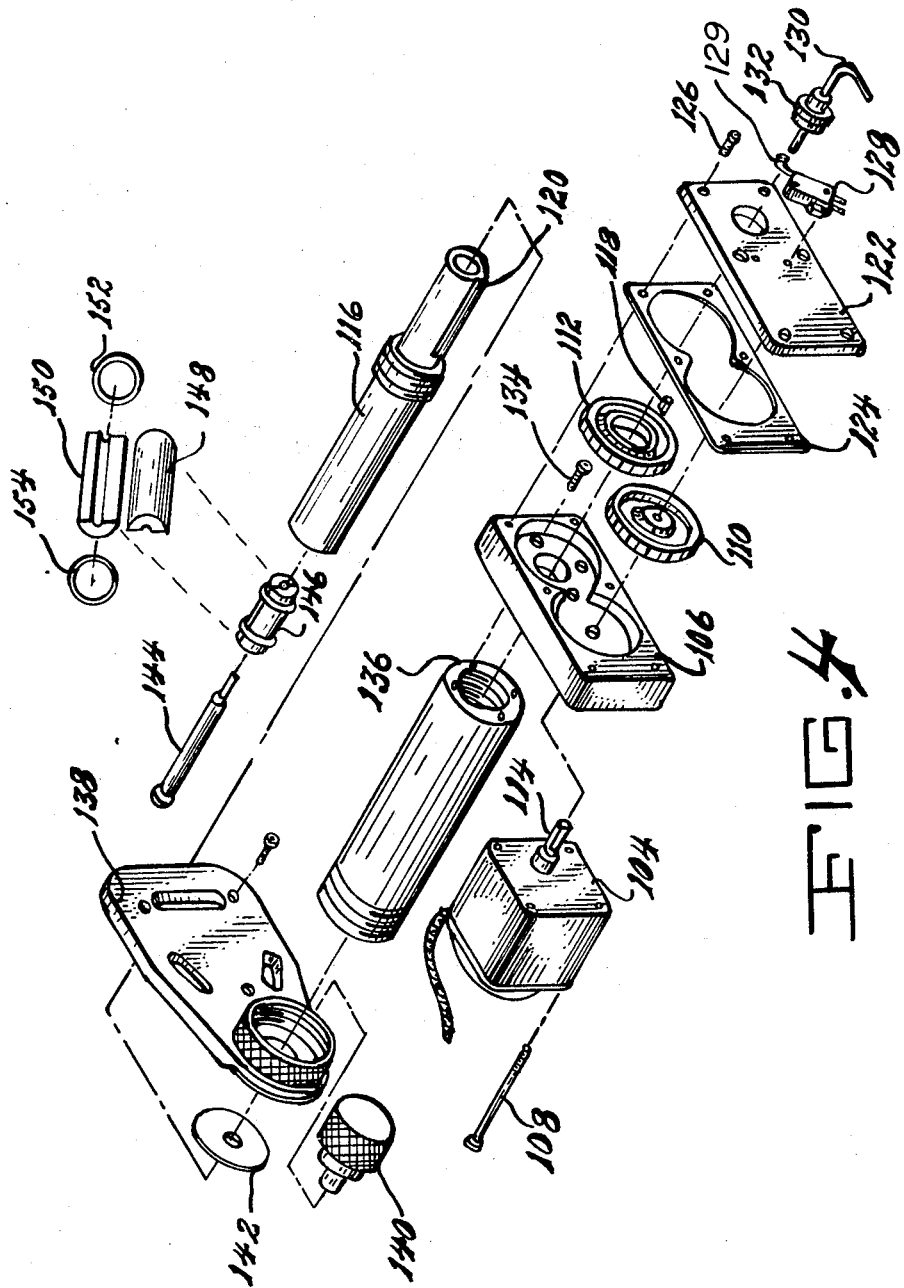
FIG. 4 is an exploded view of the invention.

An exploded view of the probe holder and scanning mechanism is shown in FIG. 4. The reversible synchronous motor 104 is held to the gear housing 106 by four bolts one of which is shown at 108. The gear housing contains spur gears 110 and 112. Gear 110 mates with the flat sided shaft 114 of the motor 104. Gear 112 slides on the spindle 116 and is held in place by the spindle drive key 118 which slides in the slot on the gear and the slot 120 on the spindle 116. The gear housing is provided with a cover 122 having a gasket 124 therebetween. The cover is held in place by six screws exemplified by 126. Marker switch 128 is attached to the gear housing cover and the switch arm 129 rides on the spindle (116) extension. Each time the switch arm drops into the groove 120, the switch closes leaving a mark on the data record. The signal cable 130 is held in the end of the spindle by the holder 132.

The gear housing 106 is attached to the spindle housing 136 by four screws exemplified by 134. The spindle housing is held by the adapter section of the universal mounting 138.

Within the spindle housing 136 is the spindle 116 and within the spindle is the probe 144. The probe 144 is secured in the spindle 116 by the probe holder 146. The holder (146) consists of two half pieces 148, 150 which clamp around the probe and are held together by two O-rings 152, 154 which have a tight sliding fit against the inner walls of spindle. Centering pin 140 is provided to accurately align spindle housing 136 with the centerline of the hole being inspected.

Having thus described our system for eddy current flaw detection we claim the following as our invention:

1. An apparatus to perform the non-destructive testing of metals comprising: a universal planular mounting bracket; a housing; attaching means mounted on the universal mounting bracket for removably securing the housing to said bracket; spindle means mounted in said housing and adapted to have a sliding engagement with the housing along its longitudinal axis; an eddy current test instrument secured within said spindle means and extending along the longitudinal axis thereof; gear housing means secured to said housing; drive means secured to the gear housing, gears secured to the said drive means and said spindle through which the drive means may cause the spindle to achieve a rotary motion.

2. An apparatus to perform the non-destructive testing of metals according to claim 1 including: centering means adapted to be removably secured in the attaching means for positioning the universal bracket means on a work piece.

3. An apparatus to perform the non-destructive testing of metals according to claim 1 wherein: said housing is provided with threads on an internal surface and said spindle means is provided with threads on an external surface wherein said external threads engage said internal threads causing the spindle to move with a helical motion upon being rotated.

4. An apparatus to perform the non-destructive testing of metals according to claim 1 including, means for securing the test instrument comprising: a pair of blocks which when placed together along their longitudinal axis form a cylinder, and having an opening therein to grasp a test instrument; and a pair of O-rings located around said blocks to hold the blocks in position and to engage the side walls of said spindle in a tight sliding fit whereby said testing instrument will slide along the walls of the spindle if a force is applied thereto.

5. An apparatus to perform the non-destructive testing of metals according to claim 1 wherein, one end of said test instrument is split to allow for adjustment of the instrument to test pieces of varying size.

6. An apparatus to perform the non-destructive testing of metals according to claim 1 including, a calibration standard mounted in the attaching means and through which the test instrument must pass prior to testing.

7. An apparatus to perform the non-destructive testing of metals according to claim 6 wherein, said calibration standard is provided with means for perturbing the test instrument output.

8. An apparatus to perform the non-destructive testing of metals according to claim 1 wherein, said drive means is a reversible synchronous motor.

9. An apparatus to perform the non-destructive testing of metals according to claim 1 including, a normally open switch mounted on said gear housing said switch having an arm in contact with the spindle means, said spindle means having a switch activating means thereon whereby each time the spindle means completes one revolution said switch will momentarily close.

* * * * *